United States Patent [19]

Reinfeld et al.

[11] Patent Number: 4,492,663
[45] Date of Patent: Jan. 8, 1985

[54] METHOD AND ADJUSTABLE LENGTH MOLD FOR MANUFACTURING A FOAMED PACKAGING ASSEMBLY

[76] Inventors: Nyles V. Reinfeld, P.O. Box 2321, Bath, Ohio 44240; Michael J. Valentine, 78 Tower Rd., Pines Lake, Wayne, N.J. 07470

[21] Appl. No.: 456,595

[22] Filed: Jan. 10, 1983

Related U.S. Application Data

[63] Continuation-in-part of Ser. No. 338,471, Jan. 11, 1982, abandoned.

[51] Int. Cl.³ .......................... B29D 27/00; B15B 3/02
[52] U.S. Cl. ..................... 264/45.4; 53/452; 53/122; 264/46.4; 264/51; 425/4 R
[58] Field of Search ............... 264/51, 53, 45.4, 46.4; 425/4 R; 53/452, 122

[56] References Cited
U.S. PATENT DOCUMENTS

| | | | |
|---|---|---|---|
| 2,951,260 | 9/1960 | Harrison et al. | 264/53 X |
| 3,013,306 | 12/1961 | Richie et al. | 264/51 |
| 3,129,464 | 4/1964 | Heider | 264/53 X |
| 3,178,491 | 4/1965 | Dart | 264/53 |
| 3,264,381 | 8/1966 | Stevens | 264/53 X |
| 3,277,220 | 10/1966 | Plymale et al. | 264/53 X |
| 3,536,190 | 10/1970 | Hirsch et al. | 264/45.4 X |
| 3,537,131 | 11/1970 | Kracht et al. | 264/51 X |
| 3,556,460 | 1/1971 | Premo | 264/51 X |

Primary Examiner—Philip Anderson
Attorney, Agent, or Firm—Oldham, Oldham, & Weber Co.

[57] ABSTRACT

A package forming apparatus which produces containers by means of molding thermoplastic material. A mold having a fixed cross-section but a variable length mold cavity is provided by a mold core having a bottom ring means outer shell unit in operative association with the mold core but which is movable axially of the mold core to vary the operative length of the mold and a removable top end plate is provided for the mold cavity.

19 Claims, 6 Drawing Figures

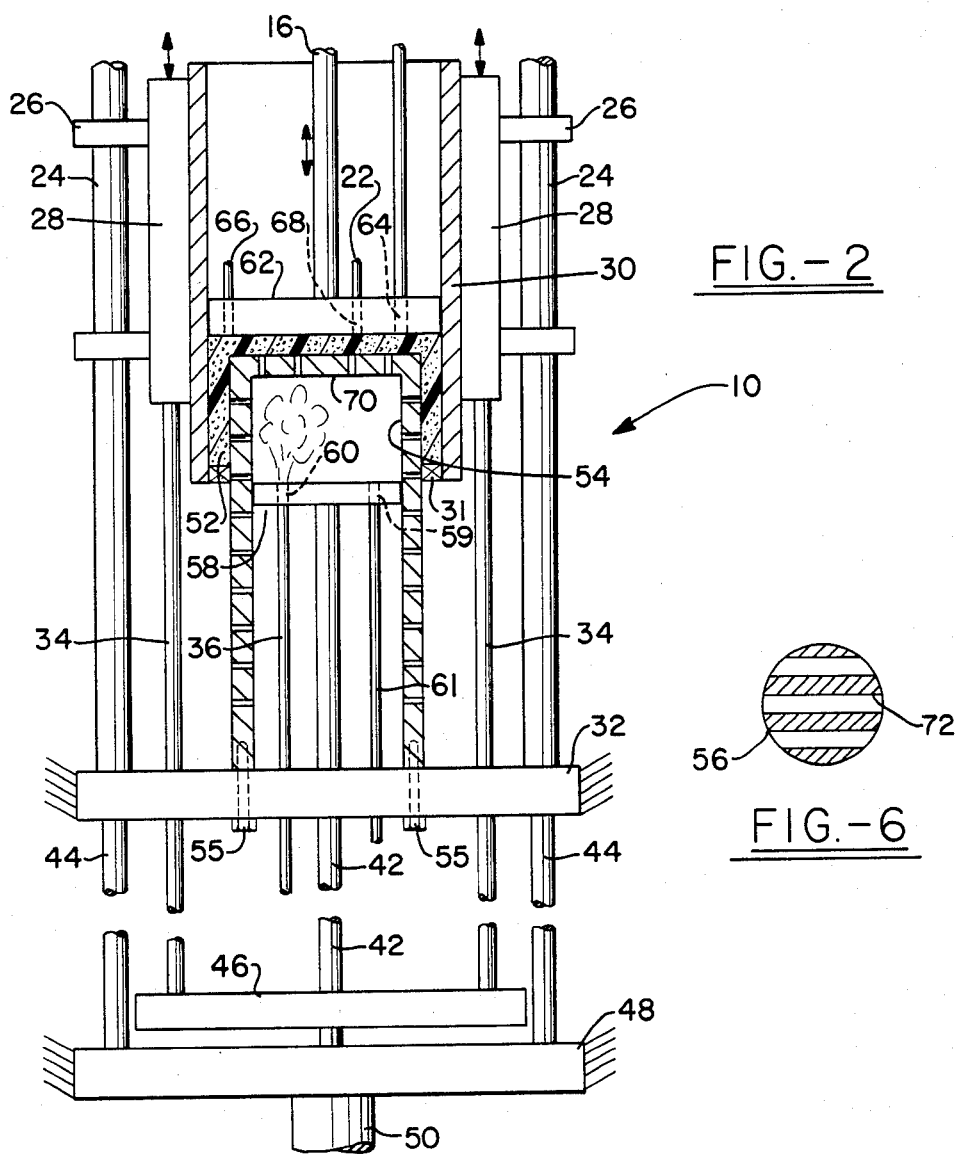
FIG.-2
FIG.-6
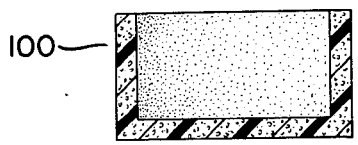
FIG.-3

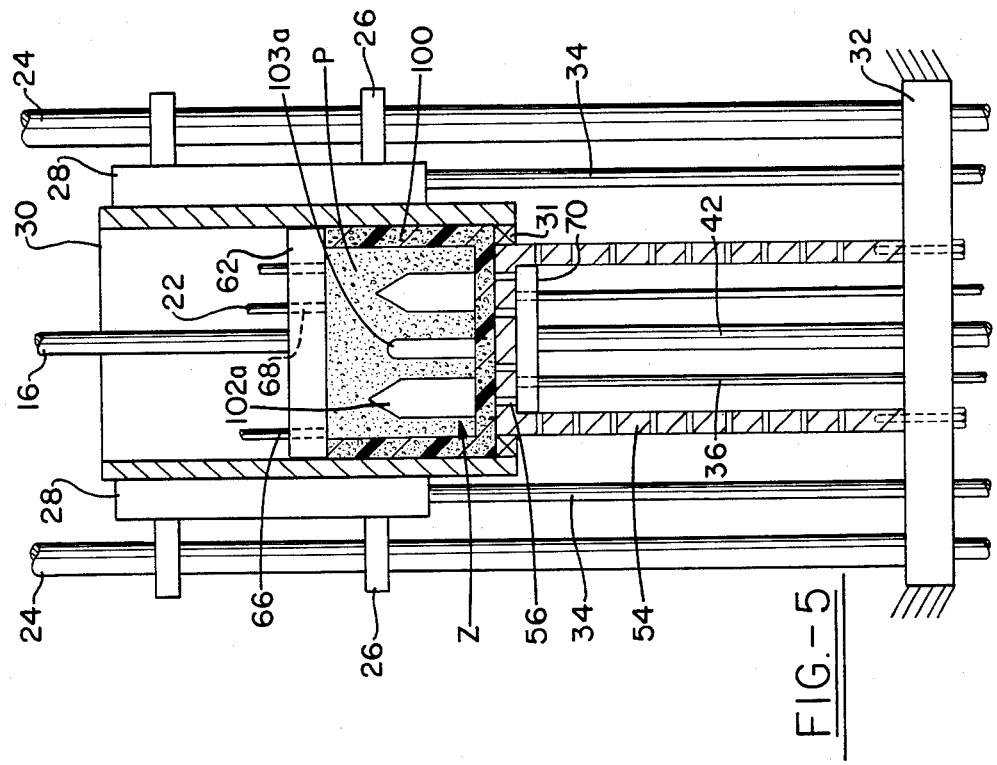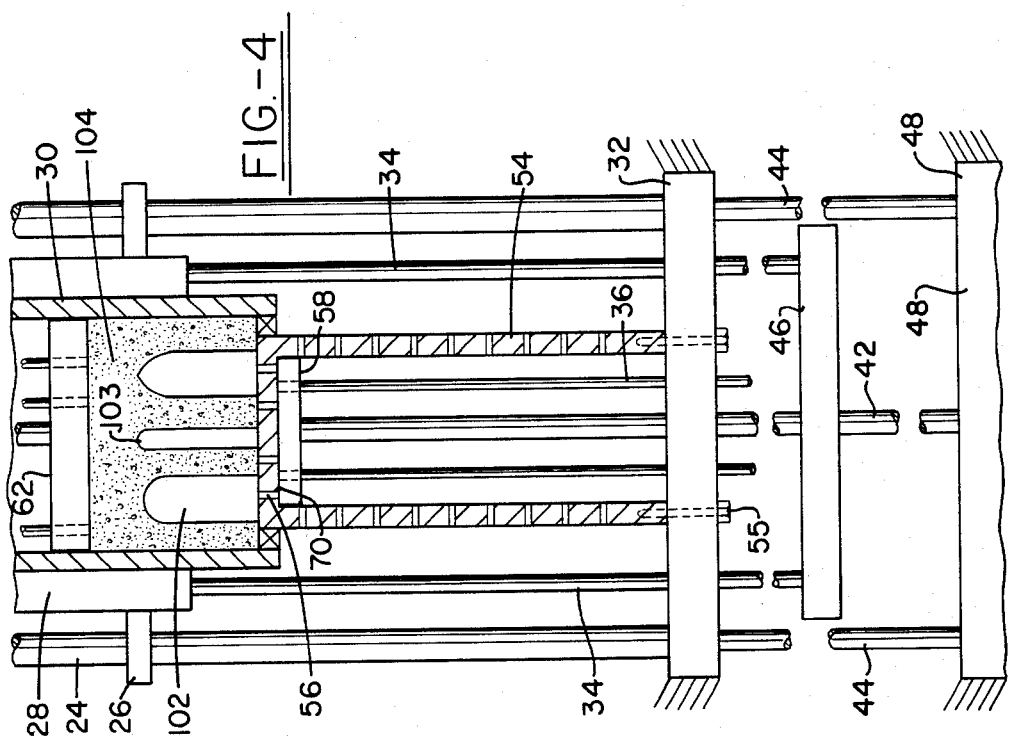

METHOD AND ADJUSTABLE LENGTH MOLD FOR MANUFACTURING A FOAMED PACKAGING ASSEMBLY

This is a continuation-in-part of application Ser. No. 338,471, filed Jan. 11, 1982 and now abandoned.

TECHNICAL FIELD

The invention herein lies in apparatus for producing packaging devices. Specifically the invention refers to a variable length mold whereby containers, constructed of polymeric material, may be manufactured. The novelty of the invention lies in the fact that the dimensions of the containers manufactured and especially the container length can be varied at will to accommodate a given specification. The device finds particular utility in the manufacture of containers for a variable number of items.

BACKGROUND ART

In most packaging operations, a plurality of sizes of containers must be ordered and stocked to ship various quantities and sizes of the packaged item. Packaging machines can produce containers of various sizes. However, to change the dimensions of the containers produced by a given machine, it is necessary to halt production and change the machine parameters. In other words, it is not possible in the current state of the art to change the dimensional parameters "on the fly" i.e., without interrupting production. While in many cases, the ability to so alter product dimensions "on the fly" is not necessary, but for other cases such as ability would be highly desirable, for example, where inventory space is at a premium and thus large production runs of a given size container cannot be stored. Another example would be an integrated operation in which the container is manufactured and utilized at the same operation. In this latter instance it would be highly desirable to have the ability to tailor make the container to the particular product to be packaged as the product itself is produced or received for packaging.

From the foregoing, it is seen that there is a need in the art for a mold device capable of manufacturing containers having a variable length. In particular, this device should be able to manufacture the containers of various lengths with minimal change in the mold apparatus.

DISCLOSURE OF INVENTION

In light of the foregoing, it is an object of the instant invention to provide a mold device capable of efficiently molding containers having various lengths but a constant cross-section.

It is another object of the invention to provide a device capable of producing containers of different lengths with a minimum of change in the procution apparatus and/or cycle.

Another object of the invention is to provide a device capable of using a variety of materials to manufacture said container.

Other objects of the present invention include providing apparatus for forming a plurality of different types of packages or enclosures for articles that can be of irregular sizes and shapes.

Another object of the invention is to provide a package for a plurality of articles wherein the articles or article can be substantially totally embedded in a fused plastic packaging mass; to provide a shipping package or container wherein different densities of packaging material can be formed as an integral article engaging mass and as a separate enclosure package for the packaged mass which different packages can be formed in one packaging machine or apparatus.

Another object of the invention is to provide an apparatus for forming an open ended closure of a desired length and to place such enclosure when formed promptly into a packaging apparatus condition, or a package forming condition.

Yet another object of the invention is to provide an apparatus for making a container having one open end and one closed end and which container has walls of substantially uniform thickness but a bottom and/or top of any desired thickness which containers are formed in a mold apparatus of relatively uncomplicated design.

The foregoing and other objects of the invention which will become apparent as the detailed description proceeds are achieved by: an adjustable length mold for forming plastic containers and the like and comprising a mold core fixedly positioned on a mold frame, a mold bottom plate and shell unit enclosing and spaced from said mold core to define a mold cavity, and means for moving said unit axially of said mold core to vary the mold cavity length.

BRIEF DESCRIPTION OF DRAWINGS

For a better understanding of the objects, techniques, and structure of the invention, reference should be had to the following detailed description and accompanying drawings wherein:

FIG. 2 is a partly broken away from elevational view shown partly in vertical cross-section of the mold apparatus of the invention;

FIG. 3 is a vertical cross-sectional view of a container made in the apparatus;

FIG. 4 is a cross-sectional view like FIG. 2 but showing how a different container can be manufactured;

FIG. 5 is a view like FIG. 2 of yet a further type of container made by the apparatus of the invention; and FIG. 6 is a section of a core vent.

BEST MODE FOR CARRYING OUT THE INVENTION

Figure 1:
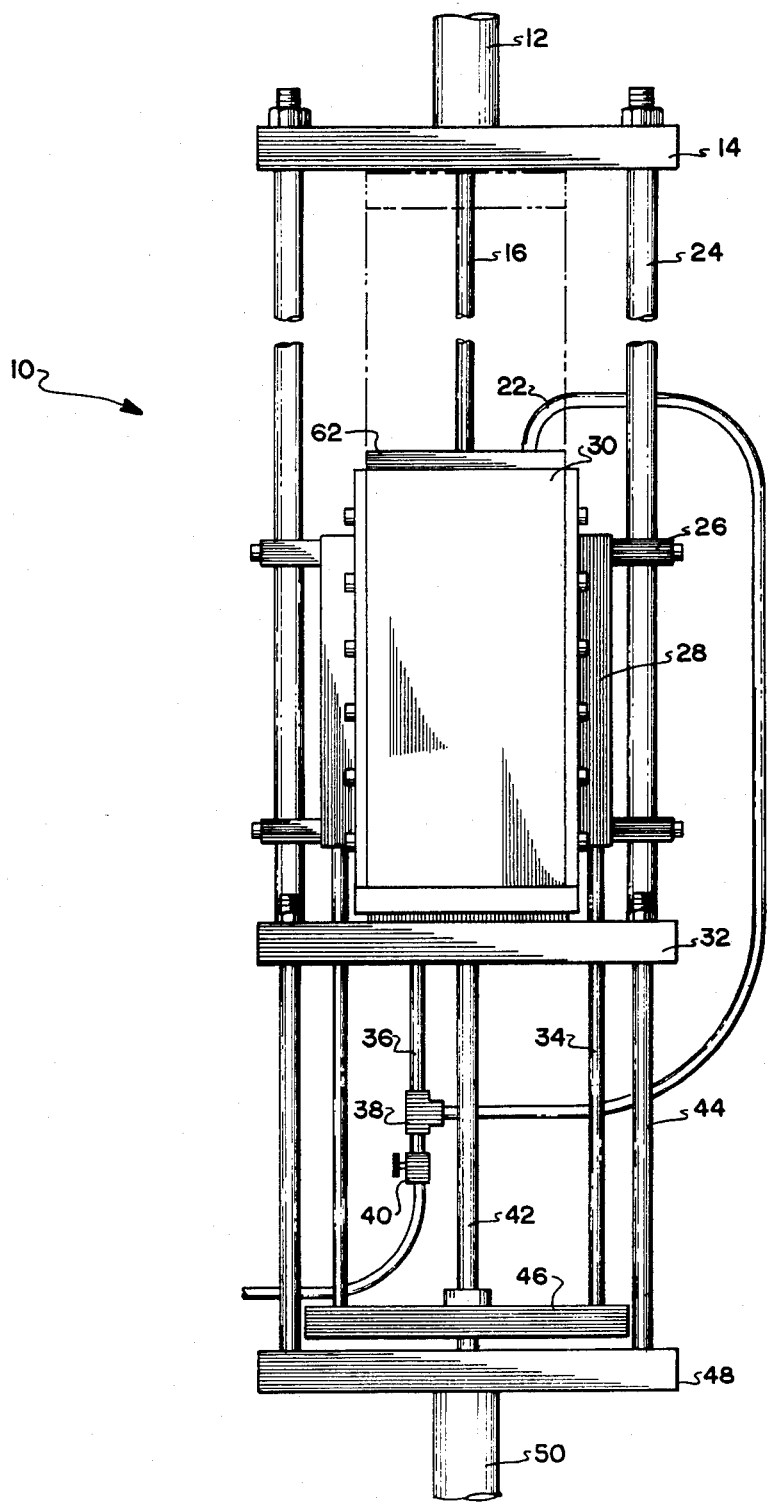
FIG. 1 is an elevation of the molding apparatus of the invention.

Reference is now made to the drawings wherein it is seen that a molding, or package forming apparatus, drawn according to the teachings of the invention is designated generally by the number 10. The package forming apparatus 10 is essentially a mold in which one dimension may be varied by means of an adjustable outer mold shell 30. The first step in a molding operation is to lower the upper plate 62. Then usually preexpanded moldable material is charged into a mold cavity 52 defined by a mold core 54 and outer mold shell 30 through charge port 64. An electronic sensor 66, of conventional design, detects when the mold volume is filled. The charge port 64 is then sealed, which simultaneously seals the mold cavity 52.

Heat is then applied to inner mold chamber 70 by means of steam which enters through steam nozzle 60. The steam is conveyed to the inner mold chamber 70 by means of the steam line 36. In like manner, steam may enter the mold cavity 52 via the top mold end plate 62 which contains a plurality of steam nozzles 68 connected to a steam line 22.

Steam lines 36 and 22 are connected to suitable steam supply and are constructed of non-corrosive flexhose which accomodates limited movement of certain mold parts. The purpose of said movements will be described hereinbelow.

The heat supplied in the inner mold chamber 70 is conveyed to the mold cavity 52 through direct conductive heat transfer through the mold core 54 and is aided by flow of steam through conventional slotted core vents 56 which are located in holes at spaced intervals along the mold core 54, as well as in the upper mold plate 62.

The core vents 56 are shown in greater detail in FIG. 6. There, it is noted that the core vents 56 are of general cylindrical shape and contain narrow slots 72 which allow steam to flow from the inner mold chamber 70 to the mold cavity 52, yet prevent the moldable material, described hereinbelow, from passing from the mold cavity 52 into the inner mold chamber 70. In all, the embodiment of the invention which is shown in the drawing may contain for example about 1,000 core vents.

The moldable material used to make the container is of the general class of polymeric materials known as thermoplastics. By way of example of thermoplastic polymers which may be used as moldable material are nylon, nitrile resins such as ABS terpolymer or other nitrile copolymers, those ionomers such as sodium or zinc salts of ethylene/methacrylic acid copolymers which exhibit thermoplastic properties, polypropylene and copolymers thereof, polyethylene and its copolymers, thermoplastic polyesters, and homopolymers and copolymers of polystyrene, with polystyrene being preferred. The particular type of thermoplastic polymer which is used as moldable material would, of course, be dictated by the particular application. The choice would depend in part on the physical properties required of the container, cost, and in the case of food containers, toxicity.

In general, the pre-expanded moldable material used may be in the form of small spheres or other shapes amenable to pouring or passing through the charge port 64. Alternatively, the pre-expanded moldable material may be conveyed to the mold cavity 52 by means of a conventional automatic conveyance stystem, such as an air blown system, in which case the shape of the pre-expanded moldable material is partially dictated by the needs of the conveyant system.

In any event, as the pre-expanded moldable material is heated to conventional temperatures, it fuses to form the desired container. Conventional moldable material is used in known manners.

The mold is then cooled down by means of air and water injected into the inner mold chamber 70. The air and water injection nozzle 59 is located in the adjustable mold end plate 58 and connects to a suitable supply line 61.

Both heating and cooling cycles are usually determined by the pressure sensing device 66 located in the top mold end plate which senses the pressure in the mold cavity 52. As the mold is heated, the pre-expanded moldable material in the mold cavity 52 expands further and thereby causes an increase in pressure which is recorded by the pressure sensing device 66. When this pressure has been maintained for a given period of time, the cooling cycle begins. During the cooling cycle the expanded moldable material, now bonded together, contracts, thereby relieving the pressure initially caused by the heating of the mold. When a sufficient drop in pressure is recorded by the pressure sensor, the cooling cycle is terminated and the formed container is ready for removal.

Product removal involves raising the mold end plate 62 by meaans of its suitable control cylinder 12 and piston rod 16. The mold end plate 62 can be moved sufficiently up out of mold 30 so that the container may be removed by sliding up over the mold core 54 and then out of the packaging apparatus 10.

To aid in the removal of the molded container, one or more air vents (not shown) located in the adjustable mold end plate 58, supplies air that is forced into the inner mold chamber 70. This air passes out through the core vents 56 and thereby forces the molded container up off of the mold core 54 to permit removal of the one end molded container 100 from the mold.

A feature of the invention is that the length of the container may be varied by movement of the adjustable outer mold shell 30 up and down upon the length of the mold core 54. The effect of this movement can be seen by a comparison of FIGS. 2 and 5. FIG. 2 shows the molding apparatus 10 being operated when adjustable outer mold shell 30 is in an upper position. Only a part of the full length of the mold core 54 is thus being utilized. In FIG. 4, by contrast, the adjustable outer mold shell 30 has been moved further upward by means of a piston rod 42 which is operated by a hydraulic cylinder 50. Now it is observed that a portion of the mold core 54 is not being used to form a part of the molded container, as only the upper end 70 of the mold core is being utilized. It is also noted that the adjustable mold end plate 58 and the outer mold 30 are a unit and move as such. Further, the mold cavity bottom ring or seal 31 which forms the mold closure for the lower edge of the mold cavity and of the container, moves as a unit with the other two pieces. The only parts of the mold which do not move with piston rod 42 are the mold core 54 and the mold end plate 62. Of course, the mating surfaces of the pieces which are slidably adjustable in relation to each other are of sufficient tolerance so that an adequate seal is maintained between the fixed and the slidable portions of the mold and any conventional seals may be used, as desired. The seals of the mold end plate 60 enable it to be moved out of the mold shell 30 and back into it readily.

In operation, the novel adjustment feature operates as follows: once the length of the container to be produced has been determined, the hydraulic cylinder 50 is operated so as to correctly associate or position the movable parts of the mold. Slidably connected to the hydraulic cylinder 50 is the piston rod 42 which moves up or down in response to the pressure applied to said hydraulic cylinder. As can be seen in reference to FIGS. 2 and 4, the outer mold shell 30 and adjustable mold end plate 58 are secured to piston rod 42 either directly or by suitable interconnection. The outer mold or shell 30 is rigidly secured to spacer blocks 28 by suitable means, which spacer blocks 38 connect to a tie plate 46 through push rods 34. The tie plate 46 is attached to and moved by the piston rod 42. The adjustable mold lower end plate 58 is attached to the tie plate 46 by the piston rod 42 or an extension thereof to move in unison with the tie plate. The mold perimeter seal ring or piece 31 is rigidly attached to the outer mold shell 30 and is in slidable sealed contact with mold core 54.

In summary, movement of piston rod 42 causes corresponding unitary movement of outer mold shell 30, the mold perimeter or cavity seal ring 31 and the adjustable mold end plate 58. Movement of these pieces as a unit in turn cause a corresponding increase or decrease in the length of mold cavity 52.

It is appreciated that, in order to prevent excessive leakage during the molding cycle, the adjustable mold end plate 58 and the mold perimeter ring 31 must be in reasonably close but not air tight tolerance with mold core 54 so that air and steam can exhaust from the mold cavity during fusion heating. To prevent binding and other problems encountered when, as here, close tolerance surfaces are moved relative to one another, it is required that said surfaces be supported by a rigid base to maintain their proper alignment.

In the instant invention, a rigid support is maintained by base support or plate 48 that is suitably secured in a fixed position to which is affixed the hydraulic cylinder 50 and bolster plate 32, the latter by means of support posts or columns 44. The vertical mold or frame supports 24 in turn are affixed to the bolster plate 32 and to a similiar top frame plate and thereby are also rigidly secured. Upon the vertical supports 24 slide the pillow block bearings 26 which provides slidable alignment and positioning for the mold spacer blocks 28 and the outer mold shell 30 attached thereto.

One of the inherent advantages of the invention is that, as the adjustable mold end plate 58 moves up along the mold core 54, the core vents 56 which are thereby outside of the molding cavity 52, are cut off from the steam. Thus, the use of the steam is self-limiting to those core vents 56 which are still located along the reduced length of the cavity 52, and a variable size steambox is provided. Likewise, the water and/or air used in the cooling cycle, and the air used in the demolding cycle are also limited to the operative length of the mold cavity 52. A drain tube can connect to the mold end plate 58.

The mold core 54 is secured to the fixed bolster plate 32 as by cap screws 55.

Because of the ease with which the mold length can be adjusted, it is possible when using the instant invention to vary the length of the molded container without shutting down the apparatus. In particular, it is possible to change the dimensions on the container manufactured cycle by cycle. Since all movements of the mold components are controlled by hydraulics, the process is amenable to automatic control. Thus, it is possible to sense by appropriate means the size of a particular production item as it passes down an assembly line and program the packaging apparatus 10 to make the appropriate size container for that production item. In other words, there is no need, as in the past, to make large purchases of containers of various sizes and inventory said containers until the production items or grouped articles which correspond to that size container are produced.

The adjustable length mold of the invention includes a frame which has top and base plates 14 and 48, mold support columns 24, the bolster plate 32, and support columns 44 all firmly and rigidly fixed together. The outer mold or shell 30 has mold spacer blocks 28 located on either side of the mold secured thereto and in turn they are secured to the pillow block bearing 26 which are slidably secured to the vertical supports 24. Thus when the adjustable mold end plate 58 and the outer mold 30 are moved, the pillow block bearings 26 move correspondingly up or down the vertical mold support columns 24 by rods 34 and plate 46.

The materials of construction of the packaging apparatus 10 consists of conventional, appropriate materials, most notably steel and aluminum. Aluminum metal comes in direct contact with the moldable material. Aluminum is preferred because of its better heat transfer characteristics and lower heat capacity compared to steel, thus allowing greater ease of heat up and cooling during the processing cycle. In addition, those portions of the device which come in contact with the moldable material may be coated with a non-stick compound such as polytetrafluoroethylene or other material aiding in mold release.

Other structural portions of the packaging apparatus 10 not coming in contact with the moldable material may be constructed of metals such as steel which offer greter structural strength than aluminum. The core vents 56 may also be constructed of any suitable material, with aluminum or bronze being preferred. Bronze has been utilized in the embodiments shown because it is the most common conventional material used in the art.

The steam lines 22 and 36 may connect to any common manifold or supply source. In general, low steam pressure is utilized, the particular pressure and temperature used being determined by the particular type of moldable material being utilized to make the container. For the preferred plastic bead material polystyrene, steam pressures in the range of between 5 and 25 PSI are usually used with 15 PSI being preferred. Saturated steam is generally used and thus the corresponding temperatures are from about between 228° and 267° F. with around 250° F. being preferred but any operative pressure and temperature can be used.

Any suitable number of the tie rods 34 may be used and they usually are positioned in blalanced realtion on the tie plate 46.

While FIG. 2 shows how an adjustable length container having one open end can be made in the apparatus of the invention, this container 100 as shown produced by the apparatus of FIG. 2 can be used in a number of different ways. Furthermore, the apparatus can be moved to the different adjusted position shown in FIG. 4 wherein the mold shell 30 is moved vertically with relation to the apparatus or frame 24 of the mold press so that the mold cavity ring 31 can be brought up into substantial horizontal alignment with the upper end 70 of the mold core. At that time, if desired, then the axially movable top mold closure plate 62 can be removed from engagement with the mold shell 30 and molding material and/or articles to be packaged can be introduced into the open center of the mold shell 30. Here a plurality of articles to be packaged are indicated at 102 and 103 and are placed on the end 70 and the moldable powder may be introduced into the mold cavity to cover the articles. Then the powder is heated to form and enclosure in which the articles 102 and 103 are embedded. Or the moldable powders can be fed into the mold cavity through the nozzle 64 or equivalent and then have the powder fused in place to form the mass 104 of plastic packaging material in which the articles are embedded at the bottom end of such mass. Then, if desired, this mass 104 can have any suitable enclosure placed therearound or an end cover can be placed over the lower end of the packaging mass 104 and the articles would be suitable to be shipped in such condition as shown in section in FIG. 4.

If desired, the packaging action can be completed by use of the container 100 as made by the mold apparatus of the invention as shown in FIG. 2 and have this container 100 be placed into the mold shell 30 in inverted form and have articles 102a and 103a placed therein. (FIG. 5) Thereafter the packaging material P is introduced into the open center of the container 100 and the material can be set up therein by application of heat and pressure through the top mold closure plate 62 and closure plate 70 of the mold core. Then the top closure plate 62 would be removed from engagement with the mold shell 30 by the control cylinder for the piston rod 16 and the article or container can be removed in any desired manner including application of fluid pressure through the top closure plate 70 of the mold core. Any suitable cover of a selectable thickness then can be suitably secured to the package Z fomred in the apparatus as shown in FIG. 5 to cover the open end of the container 100. The powdered molding material normally fills the container 100 to its open end as shown.

The container 100 of the invention has uniform thickness walls and the bottom of the container can be of any desired thickness depending on the spacing of the closure plate 62 from the mold core 54. Also a top cover can be made of any suitable thickness.

The articles shown in FIGS. 4 and 5 should preferably be positioned in spaced relation to the inner margins of the mold shell 30 to enable plastic moldable material fed to the mold cavity to flow around the articles and at least substantially embed the articles in the molded mass produced.

It should be noted that in the apparatus of the invention other suitable heater means can also be operatively connected to the mold shell 30 and/or to the mold end plate 62 is desired to aid in plastic fusing action.

The mold closing pressure is controlled in any conventional manner including use of the pressure sensing device 66 and the position of the mold end plate 62 may be varied to provide the desired pressure.

It will be seen that the container 100 can be made of plastic of one density and then the filler block P, FIG. 5, can be made of a second density. The density of the container 100 can be varied by filling the mold cavity with fusable beads under a light pressure and fusing the beads under such pressure. Or, after the mold cavity is filled with beads under light pressure, the mold shell 30 and mold end plate 58 could be moved axially to compress the beads together more and fuse the beads under higher pressure.

All of the steam of fluid supply tubes 36, 61 and equivalent in the apparatus preferably extend to the plate 46 but they may be of any suitable design and construction. Portions of such tubes are omitted in FIG. 1 for clarity and the vents 56 are omitted in the holes in the mold core 54.

The apparatus may use any suitable manual and/or automatic controls for its adjustments and molding action.

The mold core 54 and the mold shell 30 are, of course, concentric.

It will be understood that the expressions upper end, top and the like are only used in a relative sense. Thus the mold apparatus 10 could be used in other positions as inverted from the position shown.

From the foregoing it is apparent that the objects of the invention have been satisfied by the structure presented hereinabove. The concept of the invention is applicable to a wide range of packaging manufacture and a wide range of thermoplastic materials of construction.

While in accordance with the Patent Statutes, only the best mode and preferred embodiment of the invention has been presented and described in detial, it is to be understood that the invention is not limited thereto or thereby. Accordingly, for an appreciation of the true scope and breadth of the invention, reference should be had to the appended claims.

What is claimed is:

1. A method of making a packaging assembly in an adjustable length mold formed within a mold shell by a hollow mold core and an axially movable mold end plate, said mold core having a fixed position, a bottom plate positioned within said mold core and being movable axially thereof in sealed relation thereto, said mold shell being movable axially in relation to said mold core, said mold having a mold cavity with one open end and a closed end formed by said mold shell, mold core and mold end plate, the mold being adapted to make a container having side walls, a bottom and an open end, the length of the side walls and the thickness of the bottom being adjustable, comprising the steps of:
    adjusting the axial position of the mold shell in relation to the mold core to adjust the side wall length of the container;
    forming a closed mold cavity by moving said mold end plate axially into said mold shell a desired distance to place it in spaced relation to an end of said mold core to control the thickness of the bottom of the container to be formed;
    filling the mold cavity with expandable thermoplastic beads; and
    heating the plastic material to expand it into a mass including a container having a bottom of a predetermined thickness and side walls of a predetermined length.

2. A method of making a packaging assembly as in claim 1, where said mold core has an upper end plate and said mold core is apertured, said bottom plate being movable as a unit with said mold shell, and including supplying said bottom plate with heater fluid to flow from the said mold core between said bottom plate and said upper end plate or pressure fluid to force the newly formed container away from said mold core.

3. A method of making a packaging assembly in an adjustable length mold having a mold cavity with one open end and a closed end, which mold includes a hollow center mold core, a mold shell enclosing and spaced from said mold core to define a mold cavity having an open end, said mold shell including a bottom mold ring means engaging the said mold core and means for moving said mold shell axially of said mold core to vary the operative length of said mold cavity, comprising the steps of:
    placing articles at the closed end of the mold cavity,
    adjusting the length of packaging assembly to be formed to accommodate the articles,
    forming a closed mold cavity enclosing said articles,
    filling the mold cavity with expandable thermoplastic beads to at least partially surround the articles, and
    heating the beads to soften and expand them into a mass having the articles as a part thereof.

4. A method as in claim 3, including forming a one open-end and one closed-end plastic container,
    placing said container in said mold cavity with said container closed end being adjacent to the closed end of said mold cavity, and
    placing articles in said container, and thereafter performing said forming, filling and heating steps to make a packaging assembly including an outer plastic container having a plastic mass therein.

5. A method of making a packaging assembly in an adjustable length mold having a mold cavity with one open and a closed end and where the mold includes a hollow center mold core, a mold shell enclosing and spaced from said mold core to define a mold cavity having an open end, a bottom plate slidably engaging the center of said mold core, and formed into a unit with said mold shell that is movable axially of said mold core to vary the operative length of said mold cavity, and a top end plate for the mold cavity in removable engagement with said mold shell to close the open end of the mold cavity, the method comprising the steps of:

forming an open end container of a cross section to fit into said mold cavity, placing the container in the said mold with its open end facing the open end of said mold cavity; and putting an article within the container;

adjusting the length of the mold cavity to that of said container;

forming a closed mold cavity by said top end plate to enclose said container;

filling the container with expandable thermoplastic beads to surround the article, and heating the plastic beads in the container to expand them into a mass positioned in the container and having the article embedded therein.

6. A method as in claim 5 where said mold core is perforated and said mold core has an upper end plate, and including supplying heating fluid to said bottom plate to heat said mold core between said bottom plate and said upper end plate and expand said beads, moving said top end plate out of said mold shell and providing pressure fluid to said bottom plate to flow from said mold core and eject the plastic mass from the mold cavity.

7. An adjustable length mold for forming plastic containers and the like comprising:

a fixedly positioned hollow center mold core having a perforated top end plate, a mold shell enclosing and spaced from said mold core to define a mold cavity having an open end, said mold core and said mold shell axially overlapping in the mold, said mold shell including a bottom mold ring means slidably engaging the said mold core, a bottom plate slidably engaging the center of said mold core, means for supply of a pressure fluid to said bottom plate for flow through said top end plate for container ejection, means interconnecting said bottom plate and said mold shell to form a unit thereof, means for moving said unit axially of said mold core to vary the operative length of said mold cavity, and, a top end plate for said mold cavity in removable engagement with said mold shell to close the open end of the mold cavity.

8. An adjustable length mold for forming plastic containers and the like including a bottom and side walls comprising:

a hollow center perforated mold core, a mold shell enclosing and spaced from said mold core to define a mold cavity having an open end, said mold shell including a cavity closure means slidably engaging the said mold core, said mold cavity being of uniform section for the length thereof that forms said side walls, a bottom plate slidably engaging the center of said mold core, means interconnecting said bottom plate, and said mold shell to form a unit thereof, means for moving said unit axially of said mold core to vary the operative length of said mold cavity, and, a top end plate for the mold cavity in independently removable engagement with said mold shell.

9. An adjustable length mold for forming plastic containers and the like comprising:

a hollow center mold core, a mold shell enclosing and spaced from said mold core to define a mold cavity having an open end, said mold shell including a bottom mold ring means slidably engaging the said mold core, a carrier plate positioned for movement axially of the adjustable length mold, a bottom plate slidably engaging the center of said mold core, means interconnecting said bottom plate, said carrier plate and said mold shell to form a unit thereof, means for moving said unit axially of said mold core to vary the operative length of said mold cavity, and, a top end plate for the mold cavity in removable engagement with said mold shell.

10. An adjustable length mold according to claim 9, wherein a frame is provided and it has support rods extending axially of said mold, said unit being slidably positioned on said support rods, and means secure said mold core to said frame.

11. An adjustable length mold according to claim 9, wherein said mold core has an upper end plate adapted to receive articles thereon, said mold ring means can be moved relative to said core to be positioned in substantial horizontal alignment with said upper end plate to form a mold cavity with the interior of said mold shell extending upwardly from said upper end plate to said top end plate whereby plastic can be fed into said mold cavity to form a plastic block in which said articles are embedded.

12. An adjustable length mold according to claim 9, wherein said mold core has an upper end plate, and said upper end plate is apertured for access to said mold cavity by heating fluids to heat plastic in said mold cavity and by pressure fluids to eject an article.

13. An adjustable length mold according to claim 12, wherein said bottom plate is apertured, and means connect to said bottom plate to supply heating and pressure fluids only to the interior of said mold core between said top end plate and said bottom plate for flow to said mold cavity.

14. An adjustable length mold according to claim 9, wherein said unit and mold core are adjustable in relation to each other and the length of the container produced is determined by the relative axial positions of said unit in relation to said mold core of said top end plate in relation to an adjacent end of said mold core, and said mold cavity is not fluid tight.

15. An adjustable length mold according to claim 21, wherein said mold core includes a top end plate, said bottom mold ring and said bottom plate can be substantially aligned in the mold, and said bottom plate forms an enclosure in the hollow center of said mold core with said top end plate.

16. An adjustable length mold according to claim 15, wherein said bottom mold ring means forms a closure for one end of the mold cavity between the inner surface of said mold shell and the outer surface of said mold core, and said bottom plate has fluid supply means connected thereto for supply for fluid only to the mold core portion between said top end plate and said bottom plate, and said mold core is apertured.

17. An adjustable length mold as in claim 12 adapted to form a product having side walls and one closed end, wherein said mold core is of uniform section for the length thereof and said mold cavity is of uniform section except for a mold cavity section for forming an end portion on the molded product, said end portion being formed between said upper end plate and said top end plate.

18. An adjustable length mold according to claim 9, wherein said mold shell mounts said bottom mold ring that encircles said mold core, and said bottom plate form an enclosure with the hollow center of said mold core, said bottom mold ring forming one end for said mold cavity, said mold cavity being of uniform section for the length of said mold core.

19. An adjustable length mold according to claim 9, wherein a frame is provided and it has support rods extending vertically, means to engage said unit to slidably position it on said support rods, said mold core being apertured and being fixedly supported on said frame, and said mold core having an upper end plate, said mold core and said bottom plate forming an adjustable length heating chamber in the upper end of said mold core.

* * * * *